(12) United States Patent
Coope et al.

(10) Patent No.: US 7,967,538 B1
(45) Date of Patent: Jun. 28, 2011

(54) CAPTURED SCREW ASSEMBLY

(76) Inventors: Robert L. Coope, Phoenix, AZ (US);
Gordon R. Coope, Glendale, AZ (US)

( * ) Notice: Subject to any disclaimer, the term of this patent is extended or adjusted under 35 U.S.C. 154(b) by 853 days.

(21) Appl. No.: 11/765,284

(22) Filed: Jun. 19, 2007

Related U.S. Application Data

(60) Provisional application No. 60/814,913, filed on Jun. 19, 2006.

(51) Int. Cl.
*F16B 21/00* (2006.01)
(52) U.S. Cl. .......................................... 411/348; 411/999
(58) Field of Classification Search .................. 411/107, 411/348, 352, 353, 999
See application file for complete search history.

(56) References Cited

U.S. PATENT DOCUMENTS

| | | | | |
|---|---|---|---|---|
| 748,078 | A * | 12/1903 | Kaisling | 292/251 |
| 2,018,346 | A * | 10/1935 | Busby | 70/90 |
| 2,831,520 | A * | 4/1958 | Clarke | 411/349 |
| 3,561,075 | A * | 2/1971 | Selinko | 24/704.1 |
| 4,026,605 | A * | 5/1977 | Emmerich | 299/107 |
| 4,119,131 | A * | 10/1978 | Cosenza | 411/352 |
| 4,125,140 | A * | 11/1978 | Basile | 411/106 |
| 4,759,671 | A * | 7/1988 | Duran | 411/347 |
| 5,941,669 | A * | 8/1999 | Aukzemas | 411/107 |
| 6,406,210 | B1 * | 6/2002 | Parrish et al. | 403/16 |
| 6,709,214 | B1 * | 3/2004 | Angehrn | 411/533 |

* cited by examiner

*Primary Examiner* — Flemming Saether
(74) *Attorney, Agent, or Firm* — Parsons & Goltry; Robert A. Parsons; Michael W. Goltry

(57) ABSTRACT

A captured screw assembly is disclosed for locating a fixture plate relative to a base plate. The assembly includes a screw with a head having a diameter larger than the threaded body to form a shoulder. A bushing is frictionally engaged in an opening in the fixture plate and includes a central opening extending through the bushing and the fixture plate. The screw extends through the central opening of the bushing and threadedly engages a threaded hole in the base plate to accurately position the fixture plate relative to the base plate. The shoulder of the screw and a shoulder in the central opening of the bushing abut when the screw is fully engaged in the threaded hole. The screw and bushing include a capture feature formed therebetween to retain the screw within the bushing when the screw is disengaged from the threaded hole.

10 Claims, 4 Drawing Sheets

CAPTURED SCREW ASSEMBLY

CROSS REFERENCE TO RELATED APPLICATION

This application claims the benefit of U.S. Provisional Application No. 60/814,913, filed 19 Jun. 2006.

FIELD OF THE INVENTION

This invention generally relates to apparatus for locating components, such as holding fixtures, in tools during manufacturing.

BACKGROUND OF THE INVENTION

In manufacturing it is often necessary to locate fixture plates (holding fixtures) on the table of a machine tool or on a base plate attached to the table of the tool used to perform an operation. In general, a variety of machine tools, such as lathes, milling machines, routers, etc. may be used in manufacturing. Each time a holding fixture is positioned on a machine table or base plate, it must be accurately located with respect to the axes of the machine and firmly secured. The usual procedure is to locate the fixture with a minimum of two dowels which are passed through holes in the fixture plate into corresponding holes in the machine table or base plate attached to the table below. Similarly, cap screws are used to secure the fixture to the table. Screws pass through the fixture into corresponding threaded holes in the base plate or machine table below. Each time a holding fixture is mounted on a machine tool, the appropriate sizes and quantities of screws and dowels must be located and inserted into the correct holes. This involves a significant amount of time, particularly if the required hardware is misplaced or lost.

The prior art addresses some of these problems by use of locating bushings in the fixture plate, corresponding receiver bushings in the machine tool table or a base plate attached to the machine, and a locator containing a mechanism which forces several balls radially outwardly into an annular groove in the receiver bushing. The shank of the locator projects a considerable height above the working surface of the fixture plate. This limits the space available for positioning the work piece on the holding fixture and creates the possibility of cutter path interference. In addition, another drawback of this design is its complexity, which adds considerably to its cost.

It would be highly advantageous, therefore, to remedy the foregoing and other deficiencies inherent in the prior art.

Accordingly, it is an object of the present invention to provide a new and improved screw assembly for temporarily affixing a component, such as a fixture plate, on the base plate of a tool or the like.

Another object of the invention is to provide a new and improved screw assembly with captured components so that searching for components is eliminated.

Another object of the invention is to provide a new and improved screw assembly that is relatively inexpensive and easy to fabricate.

SUMMARY OF THE INVENTION

The above objects and others are realized in a captured screw assembly for locating a fixture plate with an opening therethrough relative to a base plate with a threaded hole. The assembly includes a screw having an elongated threaded body with a head at one end, the head having a diameter larger than a diameter of the threaded body to form an outwardly directed shoulder and having a tool engaging feature at an externally accessible portion. A bushing is designed to be frictionally engaged in the opening in the fixture plate and includes an inner wall defining a central opening extending through the bushing and the fixture plate. The central opening is formed to receive the screw coaxially therethrough. The bushing includes an inwardly directed shoulder formed in the inner wall extending into the central opening. The screw and bushing are designed to cooperate to accurately position the fixture plate relative to the base plate with the screw extending through the central opening of the bushing and threadedly engaged in the threaded hole in the base plate. The bushing is formed to have the outwardly directed shoulder formed by the screw head in abutting engagement with the inwardly directed shoulder in the central opening when the screw is fully engaged in the threaded hole. The screw and bushing include a capture feature formed therebetween to retain the screw within the bushing when the screw is disengaged from the threaded hole.

In the preferred embodiment, the capture feature includes a V-groove formed in the inner wall of the bushing, the V-groove is formed with a lower relatively shallow tapered wall section and an upper relatively sharply tapered wall section. The capture feature further includes at least a ball positioned in an opening in the screw head and biased outwardly toward the inner wall of the bushing and into engagement with the V-groove when the screw is disengaged from the threaded hole. The ball is positioned and biased to cooperate with the V-groove to draw the screw upwardly into the bushing when the screw is disengaged from the threaded hole and to capture the screw in the bushing.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION OF A PREFERRED EMBODIMENT

Figure 1:
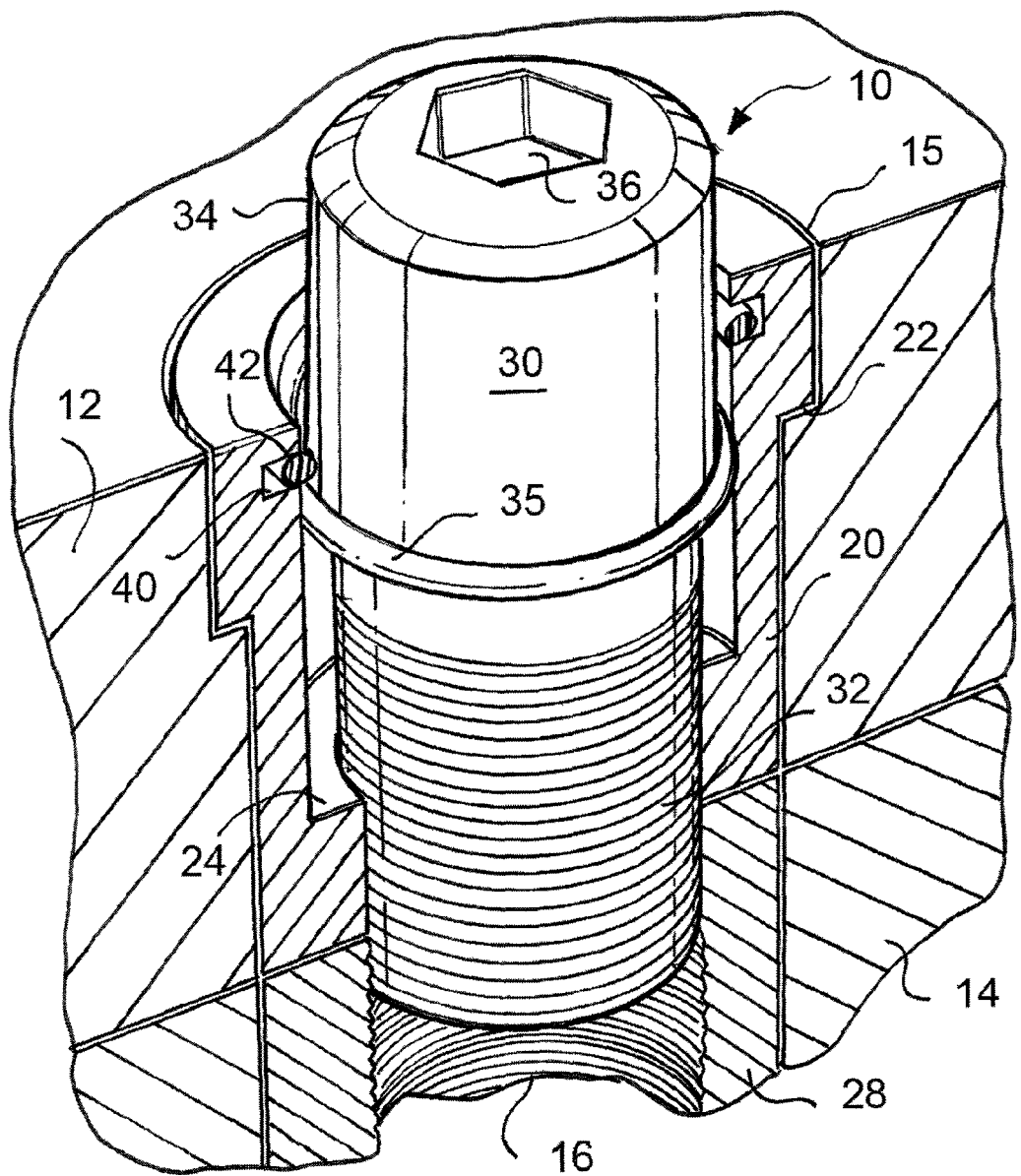
FIG. 1 is a view in perspective of a captured screw assembly locating a fixture plate on a base plate, in accordance with the present invention, portions thereof removed and shown in section.
Figure 2:
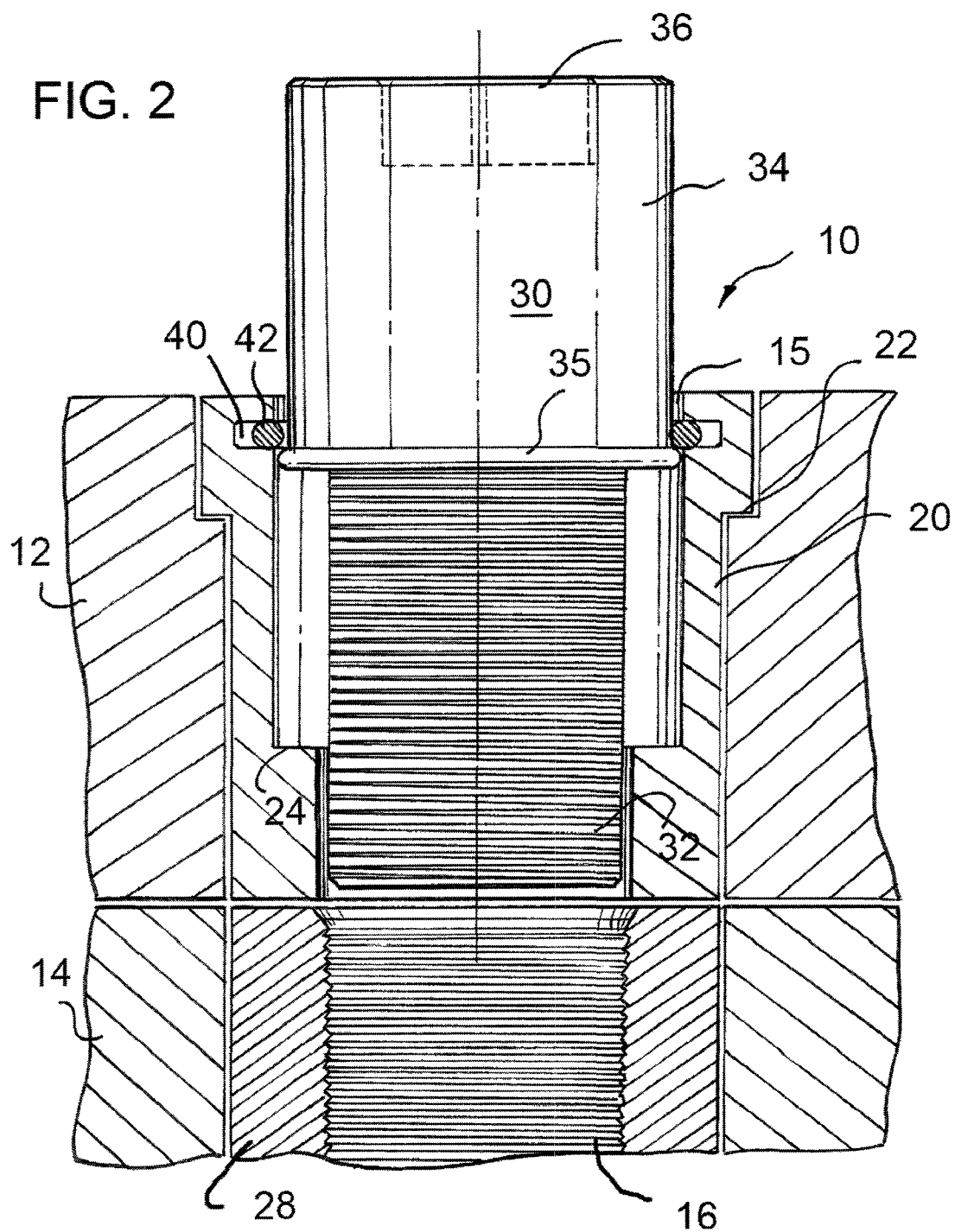
FIG. 2 is sectional view through the captured screw assembly, fixture plate, and base plate of FIG. 1, illustrating the screw assembly in an unattached or disengaged orientation.

Turning now to FIGS. 1 and 2, which illustrate a captured screw assembly, generally designated 10, temporarily affixing a fixture plate 12 on a base plate 14. It will be understood by those skilled in the art that fixture plate 12 and base plate 14 have at least two locating holes therethrough for receiving locator dowel assemblies such as those disclosed in a copending application entitled Locator Dowel Assembly, filed of even date herewith, and incorporated herein by reference. Also, fixture plate 12 and base plate 14 have a plurality of captured screw assembly holes formed therein, only one of which is illustrated and will be discussed herein for convenience of understanding.

Fixture plate 12 has a hole 15 extending therethrough and base plate 14 has a hole 16 extending therethrough and axially aligned with hole 15 by at least two locator dowel assemblies (not shown). Hole 15 through fixture plate 12 is counterbored to receive the head of captured screw assembly 10, as will be described in more detail presently. Also, hole 15 through fixture plate 12 is slightly larger than the diameter of captured screw assembly 10 to allow unhindered axial movement therethrough.

A precision bushing 20 is frictionally engaged in hole 15 through fixture plate 12 and includes a very precise inner diameter. Bushing 20 is formed with a radially outwardly extending step 22 in the outer periphery positioned to engage the shoulder created by the counter bored portion of hole 15. The counterbored portion and radially outwardly extending step 22 are positioned to orient the upper surface of bushing 20 flush with the upper surface of fixture plate 12 and to prevent further axial movement of bushing 20 within hole 15 of fixture plate 12. Also, bushing 20 is further provided with an inwardly directed step 24 part way along the inner diameter.

While a bushing 28 is shown frictionally engaged in hole 16 through base plate 12, it will be understood that a bushing may have insufficient strength to remain press fit into base plate 14 when utilized. Bushing 28 is threaded on the inside surface to receive a captured screw, as will be described presently. One skilled in the art will understand that bushing 28 may be eliminated by providing hole 16 with internal threads as has been done with reference to FIG. 5. This reduces cost and can prevent the possibility of machining forces uprooting the bushing. The length of bushings 20 and 28 is approximately the same as the thickness of fixture plate 12 and base plate 14, respectively, so that when frictionally engaged in holes 15 and 16, respectively, they do not extend beyond either the upper or lower surfaces of fixture plate 12 and base plate 14. While the lengths of the bushings could be slightly less than the thickness of the fixture plates it is not generally desired as the opening would be prone to the accumulation of debris and dirt.

Captured screw assembly 10 includes a captured screw 30 having a lower threaded portion 32 and an integral head or cap portion 34. The outer diameter of head or cap portion 34 is larger than the outer diameter of threaded portion 32 so that a radially outwardly extending shoulder is formed between head or cap portion 34 and threaded portion 32. Also, a capture feature is provided, which in this embodiment includes a radially outwardly extending flange 35 formed around the periphery of head or cap portion 34 at the shoulder and extends radially outwardly past the shoulder a short distance. Lower threaded portion 32 of captured screw 30 is threaded on the outer periphery to mate with the threads on the inner periphery of bushing 28 (or threaded hole) positioned in base plate 14. Also, head or cap portion 34 of captured screw 30 is provided with a tool engaging feature at an accessible portion thereof, which in this embodiment is an axially aligned opening or depression 36 in the upper end formed to receive a hex wrench for use in tightening captured screw 30 in bushing 28.

Figure 4:
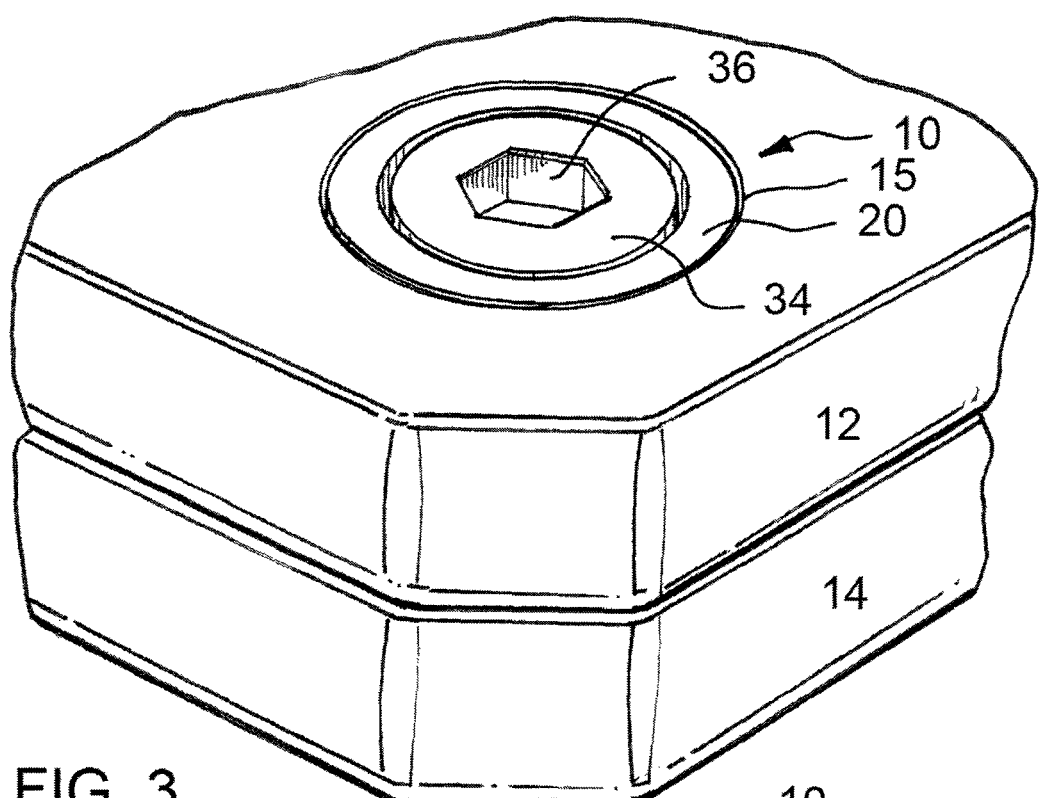
FIG. 4 is a top view in perspective of attached fixture plate and base plate with the locating screw assembly completely engaged.
Figure 3:
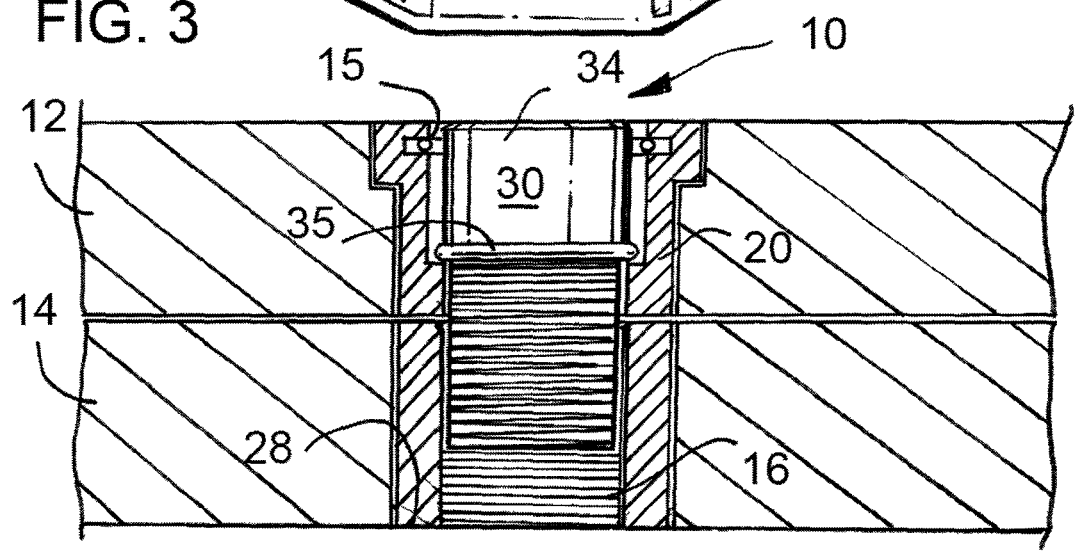
FIG. 3 is sectional view, slightly reduced in size, through the captured screw assembly, fixture plate, and base plate of FIG. 1, illustrating the screw assembly in an attached or engaged orientation.

In operation, captured screw 30 is inserted through bushing 20 in fixture plate 12 and threadedly engaged in bushing 28 (or threaded hole) of base plate 14. Captured screw 30 is then tightened, using a hex wrench in opening 36, until the shoulder between head or cap portion 34 and threaded portion 32 is butting tightly against inwardly directed step 24 in bushing 20. With captured screw 30 tightly engaged in bushing 28 the upper surface is flush with the upper surface of fixture plate 12, as illustrated in FIGS. 3 and 4, no portion remains above the surface to interfere with material or structures held by fixture plate 12 or any work being accomplished.

In this embodiment the capture feature further includes an outwardly extending groove 40 formed in the inner surface of bushing 20 adjacent the upper surface and extending around the periphery. Also the capture feature includes a flexible O-ring 42 positioned in groove 40 and sized for a slight interference fit with the outer periphery of head or cap portion 34 of captured screw 30. O-ring 42 serves the dual functions of retaining or capturing captured screw 30 in bushing 20 and preventing entrance of contaminates to the interior of bushing 20. When captured screw 30 is completely disengaged from bushing 28 in base plate 14 flange 35 engages O-ring 42 to prevent withdrawal of captured screw 30 from bushing 20. However, if it is desired to remove captured screw 30 from bushing 20 for any purpose (new captured screw or other maintenance) flange 35 is provided with rounded corners so that extra longitudinal pressure on captured screw 30 will cause O-ring 42 to be forced radially outward further into groove 40, which is deep enough to allow for this movement.

Figure 5:
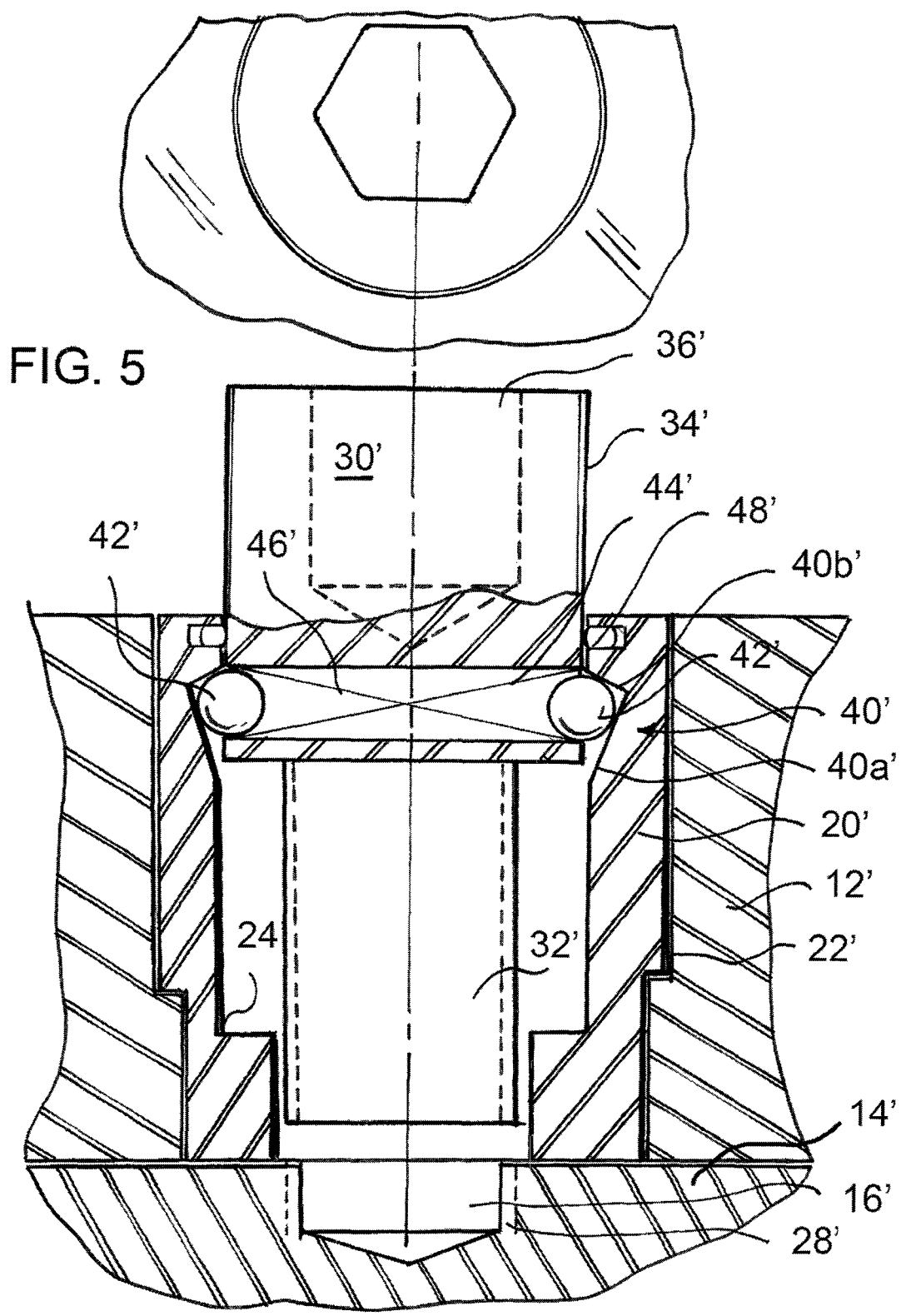
FIG. 5 is sectional view through a captured screw assembly, fixture plate, and base plate, similar to FIG. 2, illustrating a preferred embodiment of the screw assembly in accordance with the present invention.

Turning now to FIG. 5, which illustrate a preferred embodiment of a captured screw assembly, generally designated 10', temporarily affixing a fixture plate 12' on a base plate 14'. In this embodiment, components similar to components illustrated and explained with relation to FIGS. 1 and 2 are designated with similar numbers and a prime (') is added to denote the different embodiment. It will be understood by those skilled in the art that fixture plate 12' and base plate 14' have at least two locating holes therethrough for receiving locator dowel assemblies such as those disclosed in a copending application entitled Locator Dowel Assembly, filed of even date herewith, and incorporated herein by reference. Also, fixture plate 12' and base plate 14' have a plurality of captured screw assembly holes formed therein, only one of which is illustrated and will be discussed herein for convenience of understanding.

Fixture plate 12' has a hole 15' extending therethrough and base plate 14' has a hole 16' extending therethrough and axially aligned with hole 15' by at least two locator dowel assemblies (not shown). Hole 15' through fixture plate 12' is counterbored to receive the head of captured screw assembly 10', as will be described in more detail presently. Also, hole 15' through fixture plate 12' is slightly larger than the diameter of captured screw assembly 10' to allow unhindered axial movement therethrough.

A precision bushing 20' is frictionally engaged in hole 15' through fixture plate 12' and includes a very precise inner diameter. Bushing 20' is formed with a radially outwardly extending step 22' in the outer periphery positioned to engage the shoulder created by the counter bored portion of hole 15'. The counterbored portion and radially outwardly extending step 22' are positioned to orient the upper surface of bushing 20' flush with the upper surface of fixture plate 12' and to prevent further axial movement of bushing 20' within hole 15' of fixture plate 12'. Also, bushing 20' is further provided with an inwardly directed step 24' part way along the inner diameter.

In this embodiment, hole 16' includes internal threads 28', as illustrated in FIG. 5. Threads 28' on the inside surface of hole 16' are formed to receive a captured screw, as will be described presently. The internal threads 28' reduce cost and can prevent the possibility of machining forces uprooting the bushing (i.e., bushing 28 of FIG. 1). The length of bushing 20' is approximately the same as the thickness of fixture plate 12' so that when frictionally engaged in hole 15' bushing 20' does not extend beyond the upper or lower surfaces of fixture plate 12'. While the length of the bushing could be slightly less than the thickness of the fixture plate it is not generally desired as the opening would be prone to the accumulation of debris and dirt.

Captured screw assembly 10' includes a captured screw 30' having a lower threaded portion 32' and an integral head or cap portion 34'. The outer diameter of head or cap portion 34' is larger than the outer diameter of threaded portion 32' so that a radially outwardly extending shoulder is formed between head or cap portion 34' and threaded portion 32'. Lower threaded portion 32' of captured screw 30' is threaded on the outer periphery to mate with threads 28' formed in base plate 14'. Also, head or cap portion 34' of captured screw 30' is provided with a tool engaging feature, which in this embodiment is an axially aligned opening or depression 36' in the upper end formed to receive a hex wrench for use in tightening captured screw 30' in threads 28'.

In this embodiment the capture feature includes a V-groove or notch 40' and outwardly biased balls 42' in screw 32'. While two balls 42' are illustrated in this preferred embodiment, it will be understood that one or more than two might be used in specific applications. Also, balls 42' are formed of some relatively hard material, such as metal or hard plastic so that the radial outward bias on balls 42' results in an upward bias of screw 30 (explained in detail below). Outwardly opening V-groove or notch 40' is formed in the inner surface of bushing 20' adjacent the upper surface and extends around the periphery. While notch 40' can be of various shapes with the intent of receiving balls 42, in this embodiment it is formed with a lower relatively shallow tapered wall section 40a' and an upper sharper tapered wall section 40b'. Two balls 42' are positioned in a cross hole 44' through head or cap portion 34', adjacent the lower edge thereof. Balls 42' are biased radially outwardly on opposite ends of cross hole 44' by a compression spring 46' positioned in cross hole 44' between balls 42'. Restrictions at the ends of cross hole 44' prevent balls 42' from escaping cross hole 44' but allow the engagement of an outwardly extending portion of balls 42' with the tapered walls of V-groove or notch 40' and radial movement as a result of that engagement. A seal 48' extends around the inner periphery of bushing 20' adjacent the upper edge thereof preventing entrance of contaminates to the interior of bushing 20'.

In operation, captured screw 30' is inserted through bushing 20' in fixture plate 12' and threadedly engaged in threads 28' of base plate 14'. Captured screw 30' is then tightened, using a hex wrench in opening 36', until the shoulder between head or cap portion 34' and threaded portion 32' is butting tightly against inwardly directed step 24' in bushing 20'. With captured screw 30' tightly engaged in threads 28' the upper surface is flush with the upper surface of fixture plate 12' and no portion remains above the surface to interfere with material or structures held by fixture plate 12' or any work being accomplished.

In the reverse procedure, as screw 30' is unthreaded and withdrawn from threads 28' of base plate 14', balls 42' are pressed tightly against shallow tapered wall 40a' with a pressure that forces screw 30' upwardly, causing screw 30' to come completely free of threads 28' and base plate 14'. In an uppermost position (illustrated in FIG. 5) balls 42' come into contact with sharper tapered wall 40b', which stops the upward movement of screw 30'. However, if it is desired to remove captured screw 30' from bushing 20' for any purpose (new captured screw or other maintenance), screw 30' can be forced upwardly, forcing balls 42' inward into cross hole 44' and allowing screw 30' to come free.

It should be noted that in the embodiment illustrated and described in FIGS. 1 and 2 above, the screw 30 is free to move vertically in the bushing 20, after being unthreaded from base plate 14. This can result in a tendency to hang up in the threaded hole through base plate 14, mainly because of gravity. The hanging up causes a slight delay and an annoyance to the user when removing a tooling plate from a base plate. Although both embodiments operate well, in the preferred embodiment of FIG. 5 outwardly biased balls 42' and V-groove or notch 40' prevents any tendency of screw 30' from hanging up in the threaded hole in base plate 14', since screw 30' is biased upwardly (i.e. does not hang free) by the interaction of outwardly biased balls 42' and V-groove or notch 40'.

Thus, a new and novel captured screw assembly has been disclosed. The captured screw assembly is useful for attaching components such as a fixture plate on the base plate of a manufacturing tool. Also, the captured screw assembly is captured in a bushing frictionally engaged in a hole in the fixture plate so that it is always readily available and an operator does not have to spend time searching for it. Further, the captured screw assembly engages the fixture plate and a base plate so as to be flush with the upper surface of the fixture plate to reduce interference with manufacturing operations and to reduce accumulated debris.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A captured screw assembly for locating a fixture plate with an opening therethrough relative to a base plate with a threaded hole, the assembly comprising:

a screw having an elongated threaded body with a head at one end, the head having a diameter larger than a diameter of the threaded body to form an outwardly directed shoulder and having a tool engaging feature at an externally accessible portion;

a bushing designed to be frictionally engaged in the opening in the fixture plate and including an inner wall thereof defining a central opening extending through the bushing and the fixture plate, the central opening being formed to receive the screw coaxially therethrough, the bushing including an inwardly directed shoulder formed in the inner wall extending into the central opening;

the screw and bushing being designed to cooperate to accurately position the fixture plate relative to the base plate with the screw extending through the central opening of the bushing and threadedly engaged in the threaded hole in the base plate, the bushing is formed to have the outwardly directed shoulder formed by the screw head in abutting engagement with the inwardly directed shoulder in the central opening when the screw is fully engaged in the threaded hole; and the screw and bushing including a capture feature formed therebetween to retain the screw within the bushing when the screw is disengaged from the threaded hole, wherein the capture feature includes a V-groove formed in the inner wall of the bushing, the V-groove being formed with a lower relatively shallow tapered wall section and an upper relatively sharply tapered wall section, the capture feature further includes at least a ball positioned in an opening in the screw head and biased outwardly toward the inner wall of the bushing and into engagement with the V-groove when the screw is disengaged from the threaded hole, the ball being positioned and biased to cooperate with the V-groove to draw the screw upwardly into the bushing when the screw is disengaged from the threaded hole.

2. A captured screw assembly as claimed in claim 1 wherein the capture feature includes two balls positioned in a cross hole extending along a diameter of the screw and biased radially outwardly by a compression spring positioned in the cross hole between the two balls.

3. A captured screw assembly as claimed in claim 1 further including a seal extending around the periphery of the inner wall of the bushing adjacent the upper edge, the seal extending radially between the inner wall of the bushing and the outer wall of the screw head.

4. A captured screw assembly as claimed in claim 1 wherein the tool engaging feature includes an axially aligned opening in the upper end of the screw head formed to receive a tool.

5. A captured screw assembly as claimed in claim 1 wherein the tool engaging feature includes an axially aligned opening in the upper end of the screw head formed to receive a hex wrench.

6. A captured screw assembly comprising:
a fixture plate with a hole defined therethrough having an inner wall, the hole including a portion defining a radially inwardly directed shoulder in the inner wall;
a bushing including a radially outwardly directed shoulder in an outer wall thereof, the bushing being designed to be frictionally engaged in the hole defined in the fixture plate to extend coaxially approximately from an upper surface of the fixture plate to a lower surface of the fixture plate with the radially outwardly directed shoulder of the bushing in abutting engagement with the radially inwardly directed shoulder in the inner wall of the fixture plate, the bushing including an inner wall defining a central opening extending through the bushing and the fixture plate, the inner wall of the bushing including an inwardly directed shoulder extending into the central opening with a first diameter above the shoulder being larger than a second diameter below the shoulder;
a base plate with a threaded hole formed therein, the threaded hole in the base plate having a third diameter slightly smaller than the second diameter of the central opening through the fixture plate;
a screw having an elongated threaded body with a head at one end, the head having a diameter larger than a diameter of the threaded body to form an outwardly directed shoulder and having a tool engaging feature at an externally accessible portion, the diameter of the head being slightly smaller than the first diameter of the central opening and the diameter of the threaded body being equal to the third diameter of the base plate;
the screw and bushing being designed to cooperate to accurately position the fixture plate relative to the base plate with the screw extending through the central opening of the bushing and threadedly engaged in the threaded hole in the base plate, the bushing being formed to have the outwardly directed shoulder formed by the screw head in abutting engagement with the inwardly directed shoulder in the central opening when the screw is fully engaged in the threaded hole; and
the screw and bushing including a capture feature formed therebetween to retain the screw within the bushing when the screw is disengaged from the threaded hole, wherein the capture feature includes a V-groove formed in the inner wall of the bushing, the V-groove being formed with a lower relatively shallow tapered wall section and an upper relatively sharply tapered wall section, the capture feature further including at least a ball positioned in an opening in the screw head and biased outwardly toward the inner wall of the bushing and into engagement with the V-groove when the screw is disengaged from the threaded hole, the ball being positioned and biased to cooperate with the V-groove to draw the screw upwardly into the bushing when the screw is disengaged from the threaded hole.

7. A captured screw assembly as claimed in claim 6 wherein the capture feature includes two balls positioned in a cross hole extending along a diameter of the screw and biased radially outwardly by a compression spring positioned in the cross hole between the two balls.

8. A captured screw assembly as claimed in claim 6 further including a seal extending around the periphery of the inner wall of the bushing adjacent the upper edge, the seal extending radially between the inner wall of the bushing and the outer wall of the screw head.

9. A captured screw assembly as claimed in claim 6 wherein the tool engaging feature includes an axially aligned opening in the upper end of the screw head formed to receive a tool.

10. A captured screw assembly as claimed in claim 9 wherein the tool engaging feature includes an axially aligned opening in the upper end of the screw head formed to receive a hex wrench.

* * * * *